United States Patent [19]

Duran

[11] Patent Number: 5,193,956
[45] Date of Patent: Mar. 16, 1993

[54] ADJUSTABLE DIAMETER BOLT WITH ADJUSTABLE NUT

[75] Inventor: John A. Duran, Glendora, Calif.

[73] Assignee: Avibank Mfg., Inc., Burbank, Calif.

[21] Appl. No.: 823,172

[22] Filed: Jan. 21, 1992

[51] Int. Cl.⁵ .................... F16B 13/04; F16B 35/02
[52] U.S. Cl. ........................... 411/33; 411/45; 411/348; 411/383
[58] Field of Search .................... 411/24–28, 411/32, 33, 55, 45, 48, 348, 243, 432, 383

[56] References Cited

U.S. PATENT DOCUMENTS

| 2,571,265 | 10/1951 | Leutven | 411/432 X |
| 2,734,749 | 2/1956 | Benjamin | 411/33 |
| 2,747,428 | 5/1956 | Peter et al. | 411/33 X |
| 3,192,820 | 7/1985 | Pitzer | |
| 4,507,034 | 3/1985 | Lew et al. | 411/33 |
| 4,759,671 | 7/1988 | Duran | |

FOREIGN PATENT DOCUMENTS 682551 2/1930 France ........................ 411/243

62057 6/1978 Japan ........................ 411/33

Primary Examiner—Neill R. Wilson
Attorney, Agent, or Firm—Poms, Smith, Lande & Rose

[57] ABSTRACT

A self-retaining adjustable diameter bolt with an adjustable nut including a bolt having a head, a shank, and a threaded end adapted to be inserted into a hole in an installation for subsequent coupling to an nut assembly. The bolt includes a pawl with a plurality of bushing segments mounted on the bolt shank, the pawl extending through an opening in the bolt adapted to engage the segments to stop withdrawal from the bolt. The nut assembly has a first portion threaded onto the threaded end driving the segments forward and filling the spacing between the hole and bolt shank. The nut assembly includes a second portion rotatable on the first portion which can be tightened against the panel installation. In this manner, full radial expansion of the segments takes place before the first nut portion bottoms out against the installation and the second nut portion can be then tightened against the installation.

21 Claims, 3 Drawing Sheets

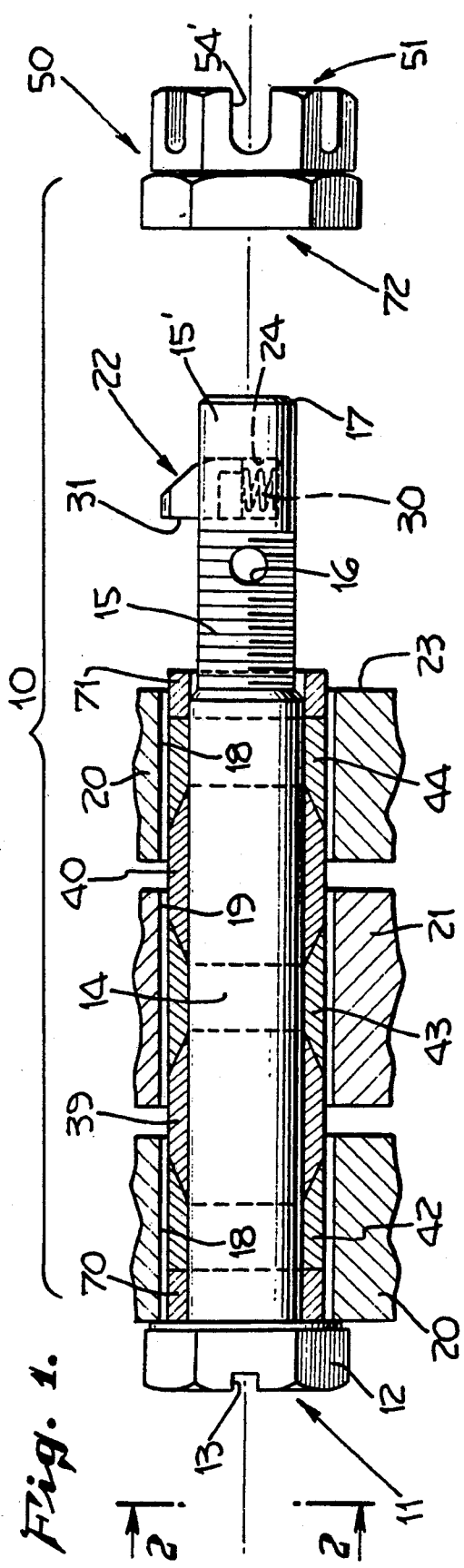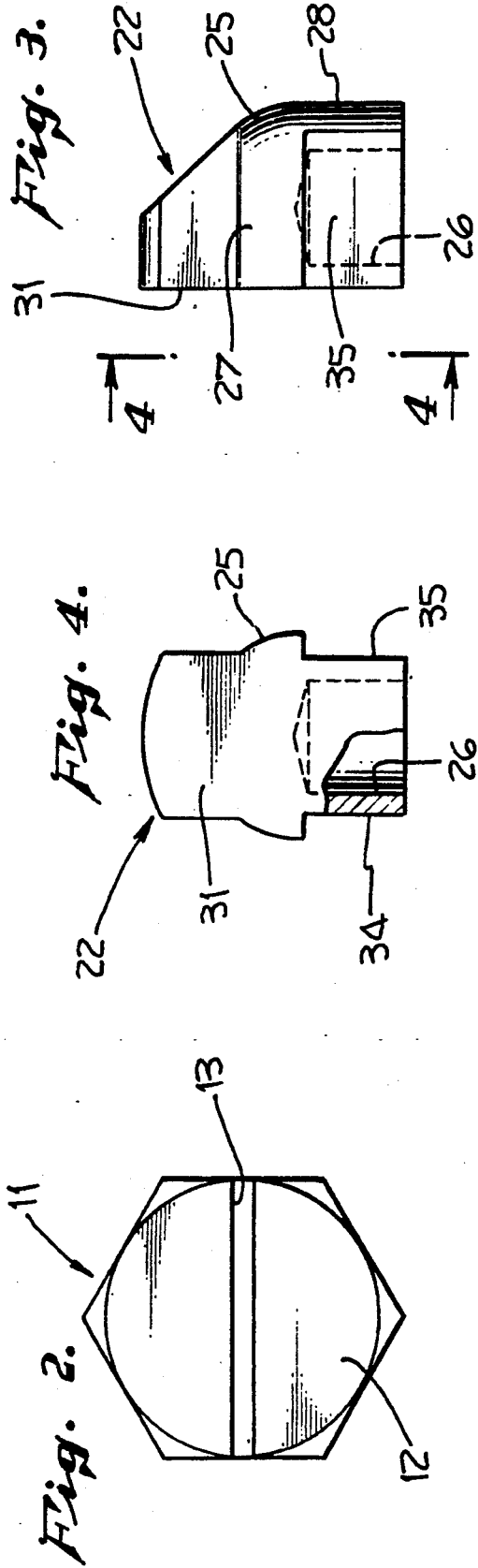

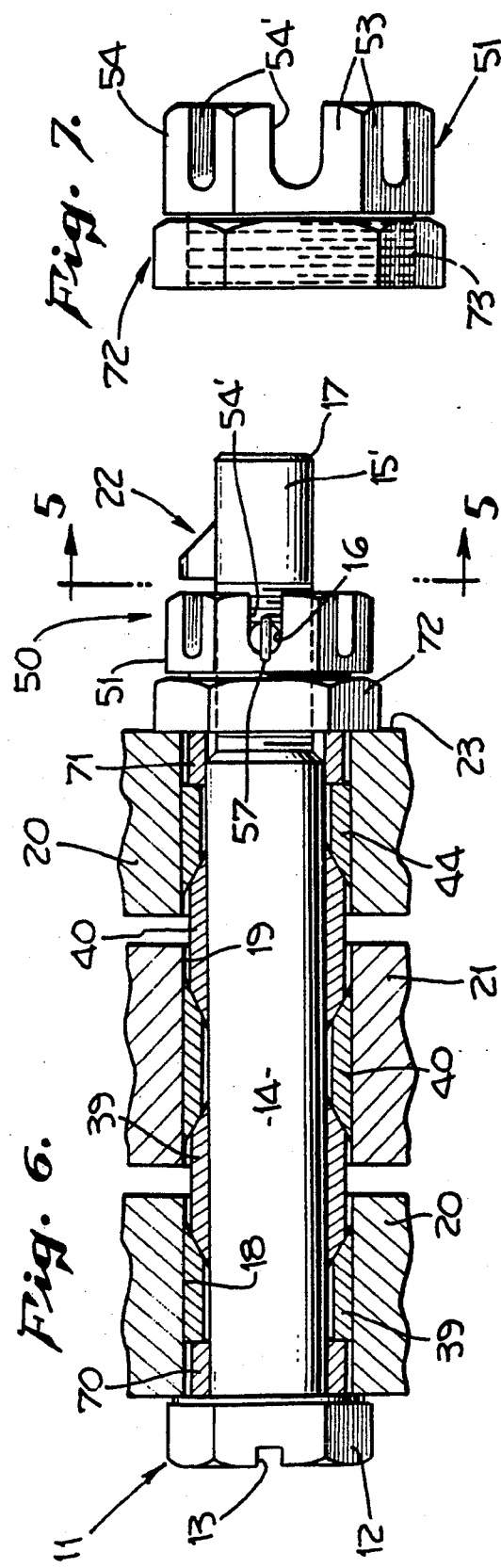
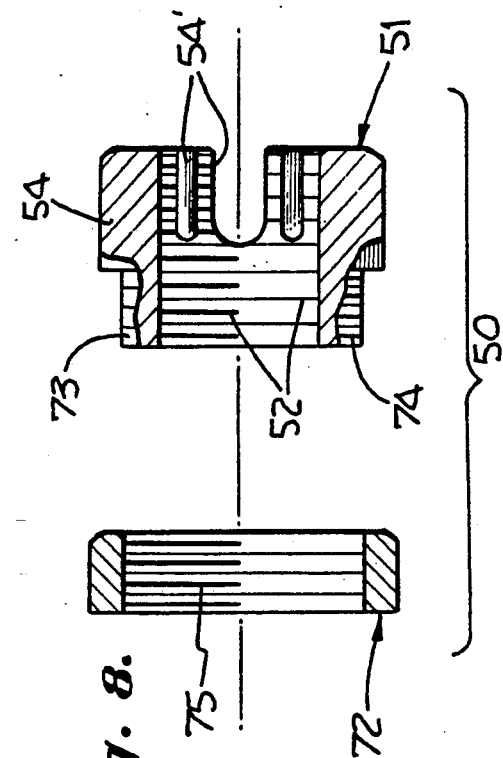
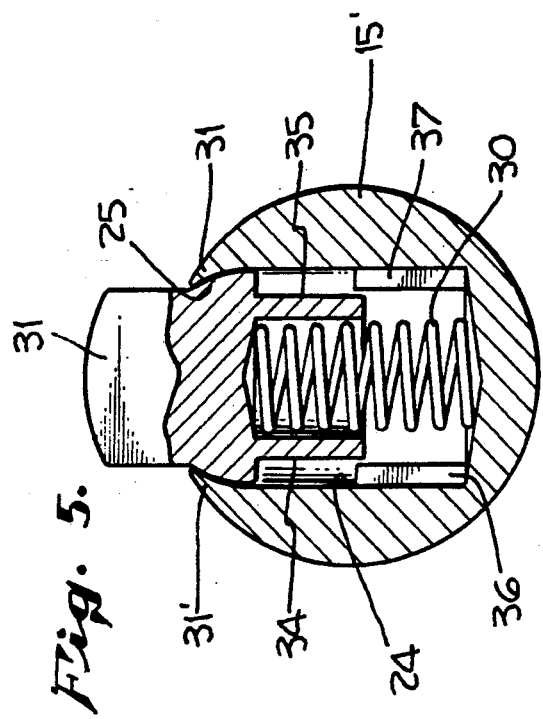

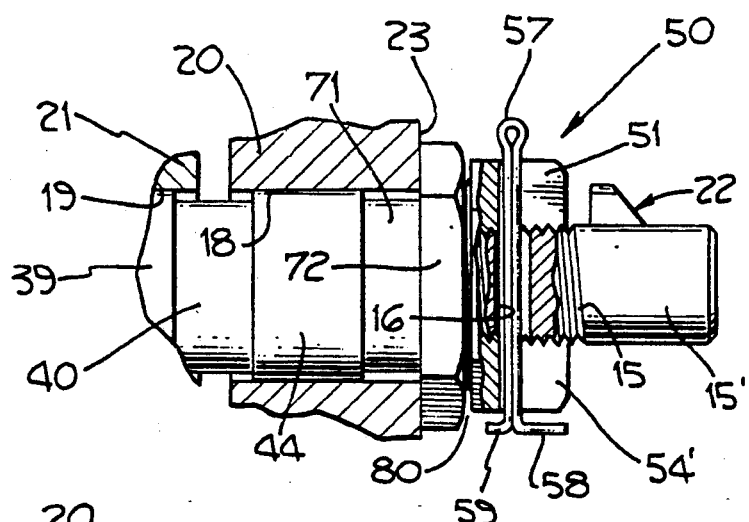
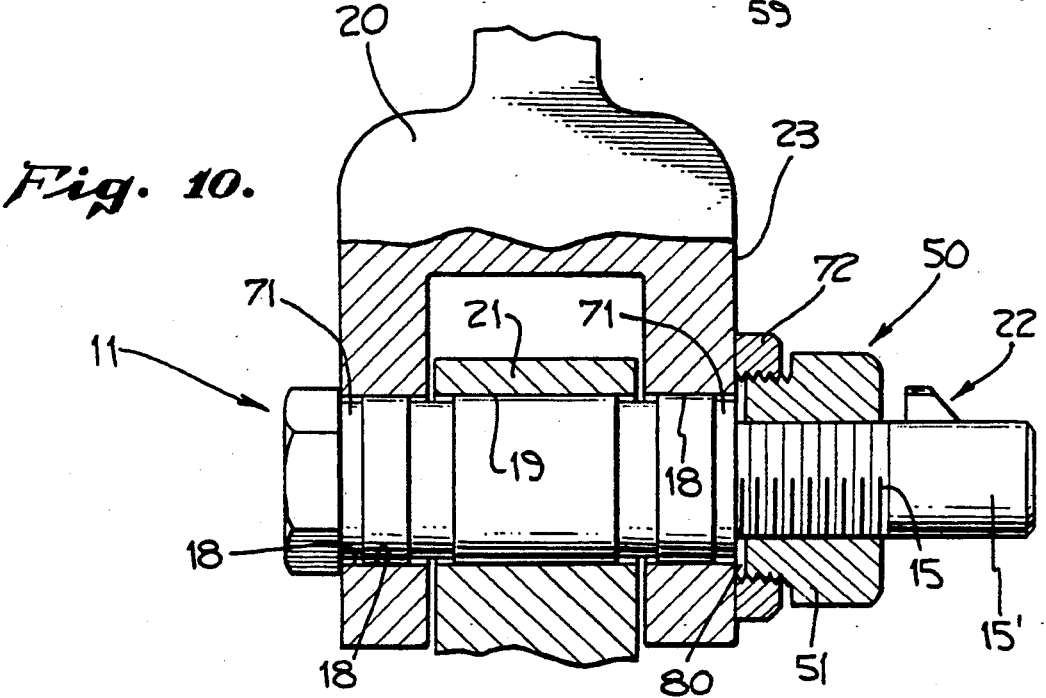
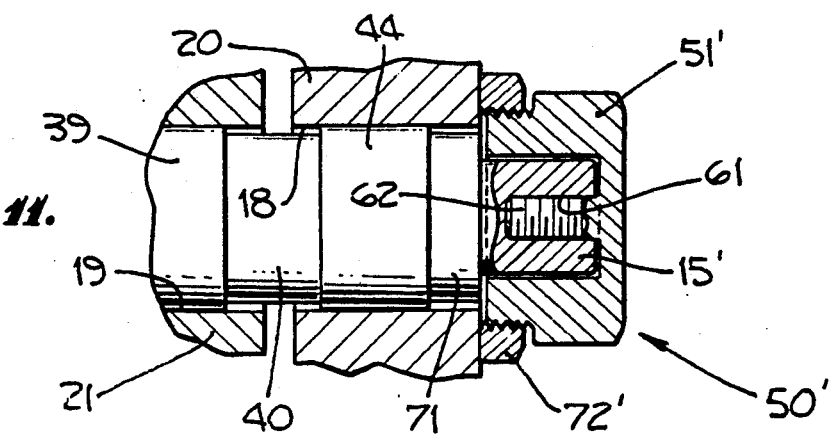

ADJUSTABLE DIAMETER BOLT WITH ADJUSTABLE NUT

BACKGROUND OF THE INVENTION

1. Field of the Invention

The invention relates to self-retaining bolt assemblies; and, more particularly, to an adjustable diameter bolt having an adjustable nut for use in aircraft and other similar installations.

2. Description of the Prior Art

Self-retaining bolts are well known in the aircraft industry. Such bolts are mounted in one panel and adapted to be selectively coupled to and disengaged from a mating member mounted in an adjacent panel. Such prior art bolts include means thereon for retaining the bolt to the panel in which it is installed so that it can't fall out during vibration or the like even if it is not connected to its mating member and for allowing subsequent easy release therefrom. One type of prior art bolt is disclosed in U.S. Pat. No. 4,759,671. In this patent, a self-retaining bolt is disclosed having means for retaining the bolt to the panel in which it is installed without weakening the bolt while permitting easy release therefrom. Such means is easy to manufacture and install, require relatively few working parts and does not require orientation in a fixed direction for assembly.

However, the holes in the panels in which such bolts are installed vary in internal diameter. It is difficult to provide a bolt having a shank diameter that tightly fits in all such panel holes. There is thus a need for filing the spacing between the bolt shank and the hole walls of the panel in which the bolt is installed. Bushing segments are known which are used to fill such spacing, such as those disclosed in U.S. Pat. No. 3,192,820 to Pitzer. In U.S. Pat. No. 3,192,820 to Pitzer, there is disclosed a quick release pin having a plurality of male and female rings or bushings which, when compressed axially as a result of a compressive force applied to one end of the bushings, forces the male rings to contract and the female rings to expand to assume a larger diameter. That is, the effective diameter of this quick release pin can be increased after the pin is installed in a hole or opening in an installation. In like manner, the effective diameter of the pin can be reduced (or returned to its original diameter) when it is desired to remove the pin from the installation.

There is a need for applying such bushing segments to a self-retaining bolt, as disclosed in U.S. Pat. No. 4,759,671, while protecting the pawl during the torquing of the bushing segments.

In my co-pending application Ser. No. 07/816,654, filed Jan. 3, 1992, I disclose an adjustable diameter bolt assembly where the bolt is properly expanded to a specific torque prior to the adjusting nut 50 bottoming out against the face 23 of the structure 21. If this occurred, it might prevent full or proper expansion of the segments of bolt There is a need for providing such an adjustable diameter bolt with means for providing full or proper expansion of the bolt before the nut bottoms out against the installation.

SUMMARY OF THE INVENTION

It is an object of this invention to provide a self-retaining adjustable diameter bolt assembly having a pawl adapted to hold a bolt of the assembly to a panel while retaining a plurality of bushing segments on the bolt.

It is still further an object of this invention to provide such an adjustable diameter bolt with a two piece nut for providing full or proper expansion of the bolt before the nut bottoms out against the installation.

These and other objects are preferably accomplished by providing a self-retaining adjustable diameter bolt assembly including a bolt having a head, a shank, and a threaded portion adapted to be inserted into a hole in a panel or aligned holes in abutting panels for subsequent coupling to a nut on the blind side thereof. The bolt includes a pawl engaging one side of the structure in which the bolt is inserted with the head thereof on the opposite side of the structure. A plurality of bushing segments are mounted on the bolt shank, the pawl extending through an opening in the bolt. A two piece nut has a first nut portion threaded onto the threaded portion of the bolt driving the segments toward the bolt head and filling the spacing between the hole and bolt shank. The nut includes a second nut portion which can be tightened against the structure after the first nut portion is tightened to drive the segments toward the bolt head.

BRIEF DESCRIPTION OF THE DRAWING

FIG. 1 is an exploded view, partly in section, of an adjustable diameter bolt assembly in accordance with the teachings of the invention;

FIG. 2 is a view taken along lines 2—2 of FIG. 1;

FIG. 3 is a detailed vertical view of a portion of the bolt assembly of FIG. 1;

FIG. 4 is a view taken along lines 4—4 of FIG. 3;

FIG. 5 is a view taken along lines 5—5 of FIG. 6;

FIG. 6 is a vertical view, partly in section, showing the bolt assembly of FIG. 1 in assembled condition;

FIG. 7 is an elevational view of a portion of the assembly of FIG. 1;

FIG. 8 is an exploded view of the nut assembly of FIG. 7;

FIG. 9 is a final assembled position in a vertical cross-section of a portion of the parts of FIG. 1 with a cotter pin installed thereon;

FIG. 10 is an elevational view, partly in section, of the assembly of the bolt and nut assembly to the structure after tightening down of the nut portions;

FIG. 11 is a vertical view of a modification of a portion of the apparatus of FIG. 1.

DESCRIPTION OF THE PREFERRED EMBODIMENT

Referring now to FIG. 1 of the drawing, a bolt assembly 10 is shown comprised of a bolt 11 having an enlarged head 12 which may be slotted, as at slot 13 and hex shaped in outer configuration, (FIG. 2). Bolt 11 includes a generally cylindrical shank portion 14 extending from head 12 and an externally threaded portion 15. Of course, portion 15 may be internally threaded, if desired.

As seen in FIG. 1, a passageway 16 is provided through portion 15 for receiving a cotter pin therein, as will be discussed further below. A cylindrical smooth surfaced end portion 15' extends from threaded portion 15 and end 15, may be chamfered, as at chamfered nose 17, if desired.

Bolt 11 is adapted to be inserted into aligned apertures 18, 19 (FIG. 6) extending through installation structures 20, 21, respectively, and be retained therein, as will be discussed. A spring biased pawl 22 (FIG. 1) is adapted to retain bushing segments, as will be discussed, on bolt 11.

A shallow hole 24 or cavity is provided in end portion 15'. This hole 24 extends only partway through end 15'. Pawl 22 is shown in FIGS. 3 and 4 removed from assembly 11. Pawl 22 has a lower generally cylindrical body portion 28, an integral mid body portion 25 curving downwardly from integral upper body portion 27, and a lower central cavity 26 in lower body portion 28. Upper body portion 27 has a forward facing wall 31 and cylindrical lower body portion 28 is of lesser outer diameter than that of mid body portion 25 (FIG. 4). Lower body portion 28 has opposed cut-out sections 34, 35. These sections 34, 35 are configured similarly to protuberances 36, 37 (FIG. 5) and are adapted to straddle the same, respectively, to maintain the orientation of pawl 22 in hole 24. In assembly of pawl 22 in hole 24, pawl 22 is placed in hole 24 with a spring 30 (FIG. 5) mounted in hole 24 entering cavity 26. The opening of hole 24 surrounding pawl 22 is peened about the periphery 31' thereof, as is well known in the art, thus trapping pawl 22 within hole 24. Pawl 22 is biased upwardly within hole 24 and forward facing wall 31 faces in the proper direction. The details and operation of such pawls or detents are disclosed in my U.S. Pat. No. 4,759,671, the teachings of which are incorporated herein by reference. Thus, protuberances 36, 37 and mating sections 34, 35 provide both quick assembly of pawl 22 and proper orientation therein so wall 31 faces in the direction indicated. Thus, wall 31 is in a position to abut against end sleeve 71 as seen in FIG. 1 to prevent the sleeves 70, 71 and bushing segments 42, 39, 43, 40 and 44 from sliding off of bolt 14 when nut 50 is not threaded thereto.

Referring to FIG. 6, bolt 11 is shown installed in abutting structures with nut assembly 50 threaded onto threaded portion 15. If it were desired to release bolt from structures 20, 21, detent 22 is merely pushed inwardly in hole 24 against the bias of spring 30 until pawl 22 enters hole 24 a sufficient distance to permit nut 50 to pass over pawl 22 and be unthreaded from threaded portion 15 and pulled off of end portion 15'. Bolt 11 can now be pulled out of aligned holes 18, 19 in structures 20, 21, respectively. Any suitable keying means may be used to orient pawl 22 in hole 24 and biasing the same.

As seen in FIG. 1, a plurality of bushings, such as five, extend along shank portion 14 between spacers 70, 71, spacer 42 being disposed against head 12, and spacer 71 being adjacent end 15'. Such bushings are adjustable bushings well known in the fastener art and disclosed in U.S. Pat. No. 3,192,820 to Pitzer. These bushings, when disposed around the shank portion of a bolt, and disposed in a panel hole, such as aligned holes 18, 29 in structures 20, 21 in FIG. 6, swell when torque is applied to fill the spacing in the hole between the bushings and the hole of the walls. Thus, bushings 42, 43 and 44 may be so-called "female" bushing segments which expand into the inside of holes 18, 19. Bushings 39 and 40 may be so-called "male" bushing segments which contract against the shank portion 14 of bolt 11 and, thus, bridge gaps between structures. Such bushing segments may also be split or non-split. Thus, segments 39, 40, 42, 43 and 44 can be either split or non-split or a combination of both.

As particularly contemplated in the present invention, means for driving end sleeve 71 forward when tightened is provided by drive nut assembly 50 (FIG. 7).

Nut assembly 50 is comprised to two separate portions, FIG. 8, first nut portion 51 and a second nut portion 72. Nut portion 51 is internally threaded at threads 52 adapted to mate with the threaded portion 15 of bolt 11. Nut portion 51 may be a counterbored castellated self-locking nut having a hex-shaped head 54 having a plurality, such as six, of flats 53 and one or more apertures 54' provided through hex head 54 for receiving a cotter pin therein as discussed in U.S. Pat. No. 4,759,671.

Nut portion 51 also includes an extension portion 73, having threads 74 on the exterior thereof adapted to mate, in a self-locking manner, to threads 75 on the inner wall of nut portion 72. The final assembled position of portions 51, 72 is shown in FIG. 7. A cotter pin 57 can now be inserted through apertures 54' (FIG. 9) and aligned passageway 16 in threaded portion 15. The free ends 58, 59 of pin 57 are then bent to positively lock nut 50 to bolt 11. If it is desired to remove nut 50, pin 57 is withdrawn by merely unbending ends 58, 59 and unthreading nut 50 from end 15.

As seen in FIG. 6, when nut assembly 50 is inserted over pawl 22 by pushing it inwardly and threaded onto threaded portion 15 and tightened, driving end sleeve 71 forward, two things are accomplished. Torque is placed on bushing segments 39, 42, 43, 40 and 44. That is, when nut assembly 50 is torqued to the recommended or predetermined torque value, nut assembly 50 causes an axial compression which causes bushing segments 39, 40 to contract against the shank portion 14 of bolt 11 and bridge the gaps between shank portion 14 and the surrounding walls of holes 18, 19 while bushing segments 42, 43, 44 expand in the holes 18, 19 against the surrounding walls thereof. This causes complete hole fill. Thus, bolt 11 is retained to panels 20, 21 without weakening the bolt 11 while permitting easy release therefrom.

It is important that nut assembly 50 be allowed to achieve the recommended or predetermined torque before nut assembly 50 bottoms out against the application (i.e., face 23 of structure 21. Thus, there will always be a gap between nut assembly 50 and structure assembly 21. This can be seen in FIG. 10 wherein a gap 80 is formed between face 23 of structure 20 and nut portion 51. When nut portion 51 is tightened against the sleeves and bushing segments, the radial expansion of the segments results in a slight gap, such as gap 80, FIG. 10, between the nut portion 51 and face 23 of the installation structure 20. The secondary nut portion 72 can be tightened, after torquing main nut portion 51, to close the gap 80.

As seen in FIG. 6, there is a full expansion of the assembly where the male bushing segments 39, 40 are disposed along bolt 11.

When the desired torque on nut assembly 50 is reached, cotter pin 57 can be inserted as heretofore discussed.

In conclusion, when the fastener 10 is installed, the installer is able to fully torque the fastener 10 into the installation to cause radial expansion of the bushing segments before the nut 50 bottoms out against the structure of the installation. If the nut 50 bottomed out before being fully torqued, the bushing segments would not be fully expanded and the fastener would not be doing its job.

Pawl 22 can be pushed down against its spring bias only so far such that the upper end is flush with outer surface of the bushing segments so the bushing segments can't move off of the bolt. Pawl 22 may be any suitable configuration and any suitable means may be used to retain the pawl 22 in hole 24 and orient the same. Such means should ensure that the pawl 22 is oriented so that it retracts easily and prevents the bolt 10 from being inadvertently removed from the application structure and/or a mating nut 50.

Any suitable materials can be used. Although assembly nut 50 is shown as a single unitary piece, it may be of the type shown in FIGS. 10 and of U.S. Pat. No. 4,759,671. Further, although nut assembly 50 is shown in FIG. 8 as internally threaded with portion 15 being also externally threaded, as seen in FIG. 11, wherein like numerals refer to like parts of the embodiment of FIGS. 1-10, bolt 11 may terminate in an internally threaded cavity 61. Nut assembly 50' may have a threaded shaft 62 adapted to thread into cavity 61. Nut portions 51' and 72' are otherwise identical to nut portions 51, 72.

It can be seen that there is described an adjustable diameter bolt assembly which fills the application, is self-retaining and positive locking. Radial expansion of the bushings segments to completely fill the installation hole is accomplished before the nut bottoms out against the installation structure. The bolt will remain in place even if the cotter pin comes out or breaks off or if the cotter pin or nut assembly is left off completely or the nut assembly backs off and unthreads during vibration. The assembly is simple to manufacture and assemble and quickly and easily oriented in the proper direction during assembly thereof.

I claim:

1. In a self-retaining bolt assembly including a bolt having an enlarged head at one end, a shank portion adjacent the head, a threaded section adjacent the shank portion, the bolt being adapted to be inserted through aligned apertures in a pair of abutting structures with the head on the access side of said structure, the bolt including a pawl disposed in a hole in the bolt movable from a first position into said hole to a second position extending out of the hole, the threaded section being adapted to be threaded to a nut assembly on the blind side of said structures, the improvements which comprises:

a plurality of bushing segments encircling the shank portion of said bolt; and said nut assembly having a first main threaded body portion tightened onto the threaded section of said bolt forcing said segments toward said bolt head whereby said segments are adapted to fill the spacing between said bolt shank portion and the walls of said aligned apertures, and said nut assembly having a second portion rotatably and threadably mounted on a threaded portion on the exterior of the first portion tightening said nut assembly against said structure when said second portion is threadably rotated on said first portion and abuts against said structure.

2. In the assembly of claim 1 wherein at least some of said segments are split ring bushing segments.

3. In the assembly of claim 1 wherein some of said segments are male-type segments adapted to contract against the shank portion of said bolt when said nut assembly is tightened onto the threaded section of said bolt, and other of said segments are female-type segments adapted to expand outwardly from said shank portion against the walls of said apertures when said nut assembly is tightened onto the threaded section of said bolt.

4. In the assembly of claim 3 wherein said male-type segments and said female-type segments are staggered along said shank portion.

5. In the assembly of claim 4 wherein said segments include a first sleeve encircling said bolt adjacent said head, a first female-type segment encircling said bolt adjacent said first sleeve, a first male-type segment encircling said bolt adjacent said first female-type segment, a second female-type segment encircling said bolt adjacent said first male-type segment, a second male-type segment encircling said bolt against said second female-type segment, a third female-type segment encircling said bolt adjacent said second male-type segment, and a second sleeve encircling said bolt adjacent said third female-type segment.

6. In the bolt assembly of claim 1 including orienting means associated with said pawl and said pawl hole for orienting said pawl in a predetermined direction.

7. In the bolt assembly of claim 1 wherein said pawl is spring biased in said pawl hole.

8. In the bolt assembly of claim 1 including an aperture extending through said threaded section, the longitudinal axis of said aperture extending normal to the longitudinal axis of said bolt, said first nut portion being a counterbored castellated self-locking nut portion threaded onto said threaded section of said bolt providing a plurality of openings for insertion of a cotter pin therethrough and through said aperture thereby positively retaining said nut assembly to said bolt.

9. In the bolt assembly of claim 1 wherein said pawl is mounted in a hole on a cylindrical portion of said bolt adjacent said threaded section at the terminal end of said bolt.

10. In the bolt assembly of claim 1 wherein said pawl is normally biased upwardly to a first position engaging said bushing segments when said nut assembly is unthreaded from said threaded section and adapted to be moved downwardly against its spring bias to a second position allowing said nut assembly to be moved therepast and off of said bolt.

11. In a self-retaining bolt having an enlarged head at one end, a threaded end and a shank portion therebetween, said bolt including a pawl adapted to extend out beyond the outer surface of said bolt when in a first position and adapted to extend back into the shank portion of said bolt when in a second position, the bolt including a hole partway therethrough, the central longitudinal axis of said hole extending in a direction generally normal to the longitudinal axis of said bolt, said bolt being free of any longitudinally extending passageway along the interior length thereof, the pawl being disposed in said hole and loosely retained therein, pawl withdrawal prevention means associated with the opening leading into the hole in which said pawl is disposed to prevent withdrawal thereout, said pawl having a face portion having a plane extending substantially perpendicular to the longitudinal axis of said bolt, spring biasing means in said hole engaging said pawl normally biasing said pawl to a first position wherein said face portion extends out of said hole and movable along an axis generally coincident with the central longitudinal axis of said hole to a second position wherein said face portion is disposed in said hole, and keying means keying said pawl to said shank portion so that said pawl is oriented so that its face portion faces the head of said bolt with the plane thereof extending substantially perpendicular to the longitudinal axis of said shank portion, the improvement which comprises:

a plurality of bushing segments encircling the shank potion of said bolt; and a nut assembly having a main threaded body portion threaded to said threaded end of said bolt, said nut assembly having a first threaded nut portion, that, when threaded to said threaded end and tightened thereon, forces said segments toward said bolt head and said nut assembly further includes a second nut portion threadably and rotatably mounted onto a threaded portion of the exterior of said first nut portion.

12. In the bolt of claim 11 wherein at least some of said segments are split ring bushing segments.

13. In the bolt of claim 11 wherein some of said segments are male-type segments adapted to contract against the shank portion of said bolt when said nut is tightened onto the threaded section of said bolt, and other of said segments are female-type segments adapted to expand outwardly from said shank portion when said nut is tightened onto the threaded section of said bolt.

14. In the bolt of claim 13 wherein said male-type segments and said female-type segments are staggered along said shank portion.

15. In the bolt of claim 11 wherein said segments includes a first sleeve encircling said bolt adjacent said head, a first female-type segment encircling said bolt adjacent said first sleeve, a first male-type segment encircling said bolt adjacent said first female-type segment, a second female-type segment encircling said bolt adjacent said first male-type segment, a second male-type segment encircling said bolt against said second female-type segment, a third female-type segment encircling said bolt adjacent said second male-type segment, and a second sleeve encircling said bolt adjacent said third female-type segment.

16. A bolt assembly comprising:

a bolt having an enlarged head at one end, a threaded end and a shank portion therebetween with a terminal end extending from said threaded end;

a spring biased pawl mounted in a hole in said shank portion adapted to extend out beyond the outer surface of said shank portion when in a first position and adpated to extend back into the shank position;

a plurality of bushing segments encircling the shank portion of said bolt; and a nut assembly having a first main threaded body portion adapted to thread to said threaded end of said bolt and be tightened thereon forcing said segments toward said bolt head and a second body portion threaded to the exterior of said first body portion disposed between the terminal end of said bolt and said segments.

17. In the bolt assembly of claim 16 wherein at least some of said segments are split ring bushing segments, said one of said segments being a non-split ring bushing segment.

18. In the bolt assembly of claim 16 wherein some of said segments are male-type segments adapted to contract against the shank portion of said bolt when said first nut portion is tightened onto the threaded section of said bolt, and other of said segments are female-type segments adapted to expand outwardly from said shank portion when said first nut portion is tightened.

19. In the bolt assembly of claim 17 wherein said segments include a first sleeve encircling said bolt adjacent said head, a first female-type segment encircling said bolt against said first sleeve, a first male-type segment encircling said bolt adjacent said first female-type segment, a second female-type segment encircling said bolt adjacent said first male-type segment, a second male-type segment encircling said bolt against said second female-type segment, a third female type segment encircling said bolt adjacent said second male-type segment, and a second sleeve encircling said bolt adjacent said third female-type segment.

20. In the bolt assembly of claim 17 including orienting means associated with said pawl and said pawl hole for orienting said pawl in a predetermined direction.

21. In the bolt assembly of claim 17 including an aperture extending through said threaded section, said first nut portion being a counterbore castellated self-locking nut threaded onto said threaded section of said bolt providing a plurality of openings for insertion of a cotter pin therethrough and through said aperture thereby positively retaining said first nut portion to said bolt.

* * * * *